United States Patent
Lavdas et al.

(10) Patent No.: US 8,219,521 B2
(45) Date of Patent: Jul. 10, 2012

(54) METHODS AND APPARATUS FOR IMPROVING DATA WAREHOUSE PERFORMANCE

(75) Inventors: Steve Lavdas, Palm Harbor, FL (US); Doug McDowell, Odessa, FL (US)

(73) Assignee: The Nielsen Company (US), LLC, Schaumburg, IL (US)

( * ) Notice: Subject to any disclaimer, the term of this patent is extended or adjusted under 35 U.S.C. 154(b) by 375 days.

(21) Appl. No.: 12/400,962

(22) Filed: Mar. 10, 2009

(65) Prior Publication Data

US 2009/0172000 A1 Jul. 2, 2009

Related U.S. Application Data

(63) Continuation of application No. 12/088,809, filed on Jun. 11, 2008, now Pat. No. 7,523,124, which is a continuation of application No. PCT/US2007/104834, filed on Jun. 26, 2007.

(60) Provisional application No. 60/816,423, filed on Jun. 26, 2006.

(51) Int. Cl.
*G06F 17/30* (2006.01)
*G06F 7/00* (2006.01)

(52) U.S. Cl. ........................ 707/606; 707/803

(58) Field of Classification Search .................. 707/640, 707/803

See application file for complete search history.

(56) References Cited

U.S. PATENT DOCUMENTS

| | | | |
|---|---|---|---|
| 5,675,785 A | 10/1997 | Hall et al. | |
| 5,970,501 A * | 10/1999 | Hunkins et al. | 1/1 |
| 6,202,070 B1 * | 3/2001 | Nguyen et al. | 1/1 |
| 6,604,108 B1 | 8/2003 | Nitahara | |
| 6,671,689 B2 | 12/2003 | Papierniak | |
| 6,882,995 B2 | 4/2005 | Nasr et al. | |
| 6,920,457 B2 | 7/2005 | Pressmar | |
| 6,947,929 B2 | 9/2005 | Bruce et al. | |
| 7,089,266 B2 | 8/2006 | Stolte et al. | |
| 7,092,931 B1 | 8/2006 | Kaluskar et al. | |
| 7,117,215 B1 | 10/2006 | Kanchwalla et al. | |
| 7,181,450 B2 | 2/2007 | Malloy et al. | |
| 2002/0156877 A1 | 10/2002 | Lu et al. | |
| 2004/0044671 A1 | 3/2004 | Yoshimura et al. | |
| 2004/0064501 A1 * | 4/2004 | Jan et al. | 709/203 |
| 2004/0148278 A1 | 7/2004 | Milo et al. | |
| 2004/0153435 A1 | 8/2004 | Gudbjartsson et al. | |

(Continued)

OTHER PUBLICATIONS

International Searching Authority, International Search Report for International application No. PCT/US07/14834, Jun. 20, 2008, 3 pages.

(Continued)

*Primary Examiner* — Kuen Lu
(74) *Attorney, Agent, or Firm* — Hanley, Flight & Zimmerman, LLC

(57) ABSTRACT

Methods and apparatus for improving data warehouse performance are disclosed. An example method to transform a first database into a second database includes analyzing a structure of the first database, generating a hierarchical file path structure reflecting the structure of the first database, and associating a mapping file with a fact table, the mapping file stored in a first hierarchical directory file path of the hierarchical file path structure. The example method also includes copying data from the first database to form the second database, the copied data being accessible from the second database via the mapping file and the fact table, receiving a request to access data in the first database, using the mapping file and the fact table to retrieve the data responsive to the analysis instruction from the second database, and outputting the retrieved data.

10 Claims, 9 Drawing Sheets

U.S. PATENT DOCUMENTS

| | | |
|---|---|---|
| 2004/0215560 A1 | 10/2004 | Amaraj et al. |
| 2004/0215626 A1 | 10/2004 | Colossi et al. |
| 2005/0050030 A1 | 3/2005 | Gudbjartsson et al. |
| 2007/0022093 A1 | 1/2007 | Wyatt et al. |
| 2007/0061287 A1 | 3/2007 | Le et al. |
| 2007/0088715 A1 | 4/2007 | Slackman et al. |

OTHER PUBLICATIONS

International Searching Authority, Written Opinion for International application No. PCT/US07/14834, Jun. 20, 2008, 7 pages.

International Bureau, International Preliminary Report on Patentability for International application No. PCT/US07/14834, Jan. 6, 2009, 8 pages.

United States Patent and Trademark Office, Office Action for U.S. Appl. No. 12/088,809, issued Jun. 17, 2008, 14 pages.

United States Patent and Trademark Office, Notice of Allowance for U.S. Appl. No. 12/088,809, mailed Dec. 15, 2008, 22 pages.

European Patent Office, "European Search Report," issued in connection with application serial No. 07796458.3, issued Apr. 17, 2012, 8 pages.

Canadian Intellectual Property Office, "Office Action," issued in connection with application serial No. 2,656,188, issued May 23, 2012, 4 pages.

Vinnik et al., "From Analysis to Interactive Exploration: Building Visual Hierarchies from OLAP Cubes," Jan. 1, 2006, 20 pages.

\* cited by examiner

METHODS AND APPARATUS FOR IMPROVING DATA WAREHOUSE PERFORMANCE

CROSS REFERENCE TO RELATED APPLICATION

This patent arises from a continuation of U.S. application Ser. No. 12/088,809 filed Jun. 11, 2008 now U.S. Pat. No. 7,523,124, which is a continuation of International application No. PCT/US2007/104834 filed Jun. 26, 2007, which claims priority from U.S. Provisional Application Ser. No. 60/816,423 filed Jun. 26, 2006, entitled "Methods and Apparatus for Improving Data Warehouse Performance" and which are hereby incorporated herein by reference in their entireties.

FIELD OF THE DISCLOSURE

This disclosure relates generally to data formatting and analysis and, more particularly, to methods and apparatus for improving data warehouse performance.

BACKGROUND

Storage, retrieval, and processing of various types of data permits businesses to engineer new business plans and/or adjust existing business plans for optimum performance. For example, a wireless telephone company may manage a data warehouse to store existing and/or new subscriber information. If the wireless company processes such collected data, growth trends may be discovered that suggest new market opportunities, and/or overburdened markets in need of service equipment rehabilitation and/or addition. Analysis of business data stored in a data warehouse may allow the business to convert such data into business intelligence, learn more about their customers, and/or make various management decisions based on empirical information rather than heuristics.

Non-business related organizations may also analyze warehoused data to meet various engineered objectives. For example, governments and/or municipalities may study population growth and/or population movement to better prepare city infrastructure and/or services for increased use. Similarly, such population trend analysis may illustrate that allocated budgets may be redirected from lesser needed city projects to higher prioritized projects in neighborhoods with substantial population growth rates.

A data warehouse may maintain copies of data for subsequent analysis. Data may include population data, financial data, business data, and/or behavioral data, such as cable television subscriptions, home buying behavior, and/or broadcast programming consumption. The data warehouse may be stored in a variety of ways, including in a relational database, a multidimensional database, a flat file, a hierarchical database, an object database, etc. Reports generated from the data warehouse are typically created to expose specific metrics important to the business, government entity, and/or other group(s). The reports typically consume a finite amount of processing and memory resources, which may result in diminished data warehouse performance as the size of the stored data increases.

Moreover, if multiple clients seek reports from a particular data warehouse at overlapping times, the decreased performance capabilities may result in unsatisfactory wait times for the clients, and/or an inability to run queries in a manner responsive to quickly changing client demands. For example, some data warehouses may require multiple hours of processing time to generate a report for a client. If the client subsequently chooses an alternate set of parameters for the report, then the client must wait a significant amount of time for the next opportunity to run a query on the overburdened data warehouse. At other times, depending on the processing loads of the data warehouse, the processing time may be lower, thereby making it difficult for a data warehouse manager to efficiently allocate and/or manage data warehouse processing time for multiple clients.

DETAILED DESCRIPTION

Figure 1:
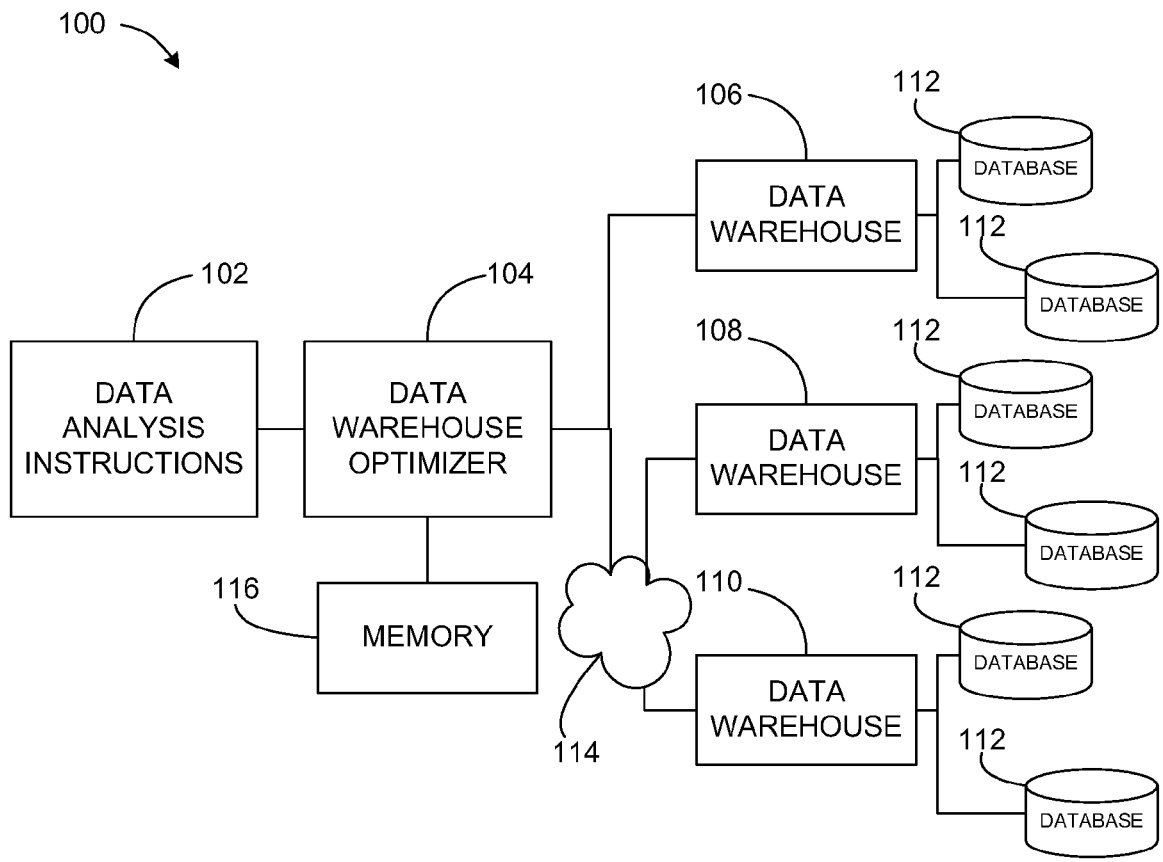
FIG. 1 is a block diagram illustrating an example data warehouse system.

Data warehouses are collecting a large amount of information regarding one or more subjects of interest such as, for example, spending habits of consumers and/or businesses, transaction data (e.g., financial market transactions, real-estate transactions, etc.), population growth information, and/or multi-media broadcast viewing behavior, to name a few. Businesses that maintain and control data warehouse facilities and/or provide data storage, processing, analysis, and/or report generating services are faced with challenges created by virtue of this growth. Generally speaking, as a data warehouse storage capacity is consumed, additional processing power and/or processing cycles are needed to analyze the increasing amount of collected data. As used herein, data analysis (processing) may include, but is not limited to, searching for trends between collected data parameters, executing statistical functions on the collected data, accumulating calculated results, and/or generating reports reflecting the results of a query for end-user review. Data processing, analysis, and/or storing functions of the data warehouse compete for processing resources, thereby taxing the data warehouse system as the collected data grows.

Data warehousing businesses that offer such storage and/or processing services to clients sometimes attempt to manage client expectations by adding processors to computer servers, adding storage space to the data warehousing system(s), and/or implementing data warehousing subsystems. In addition to changes and/or updates applied to a data warehousing infrastructure to improve performance, these data warehousing businesses may also provide their clients with advance notice of turn-around times for completed reports to ensure clients are not disappointed. If the client knows in advance how much time a given report may take, then client expectations may be accurate, resulting in increased client satisfaction. However, irrespective of advance notice to the clients, excessively long report generation processing time may still result in client dissatisfaction. Additionally, report generation processing time may be dependent upon time-of-day usage factors that cause expected processing time(s) to fluctuate unexpectedly, thereby making it difficult to accurately provide advance notice to the client.

To accommodate diverse clients, the data warehouse business may employ a number of data marts. As used herein, a "data mart" is one or more smaller databases focused on one or more particular business(es) and/or subject(s). However, despite the fact that a data mart size is less than that of the aggregate data warehouse, data mart(s) may grow to a substantially large size, thereby creating a negative effect on report generation and other database performance characteristics.

The example methods and apparatus described herein may be used to improve data warehouse performance. In general, the example methods and apparatus illustrated herein may be employed by a data warehouse on-site, and/or provided to one or more clients as an application programming interface (API) to be run on one or more personal computers, servers, and/or other computing platforms. The API may include a graphical user interface (GUI), and/or the data warehouse may provide turn-key solutions to their clients in response to simple web-based report requests.

FIG. 1 is a block diagram of an example data warehouse system 100 constructed in accordance with the teachings of this disclosure. The example system 100 includes data analysis instructions 102 that are fed to an input of a data warehouse optimizer 104. Data analysis instructions 102 may be configured as, for example, an extensible markup language (XML) file that contains details relevant to client objectives. Without limitation, the data analysis instructions 102 may be written in any computer language and/or may take any alternate form, such as text files, character delimited files, and/or binary files that may be parsed for specific data parameters, statistical methods, and/or report formatting parameters. For example, a national broadcaster client may request a report that contains viewership data for broadcast programming, news events, and/or commercial viewership. Additionally, the broadcaster client may require statistically segregated sub-reports to identify, for example, which age categories of viewers watched one or more particular broadcast program(s). Still further, the broadcaster client may require that such statistically segregated sub-reports separate viewership information by geographic boundaries, such as by country, region, state, county, and/or city. Persons of ordinary skill in the art will appreciate that data stored and/or processed by a data warehouse is not limited to viewership information, but may include any type of information. For example, data warehouse information may include, but is not limited to, financial transaction information, demographic information, subscription services consumption information, medical information, prescription drug usage and/or filling information, sales information (e.g., point of sale information), weather information, and/or behavioral information.

As discussed in further detail below, the data warehouse optimizer 104 of the illustrated example is in communication with one or more data warehouses 106, 108, 110. Each data warehouse 106, 108, 110, may include one or more databases 112 to store one or more types of data. In the illustrated example, one data warehouse 106 is communicatively connected directly to the data warehouse optimizer 104. Direct connections to the data warehouse may be accomplished via one or more connections and/or communication protocols including, but not limited to, the universal serial bus (USB) communication protocol, and/or the FireWire® communication protocol (i.e., IEEE-1394). Additionally, the data warehouse optimizer 104 and the data warehouses 106, 108, 110 of the illustrated example are communicatively coupled via a network 114, such as an intranet and/or the Internet. Suitable network 114 connections include, but are not limited to, Ethernet® communication protocols, IEEE-802.11 (Wi-Fi®), Bluetooth®, 900 MHz, 1.6 GHz, and/or mobile communications protocols (e.g., CDMA, TDMA, GSM, AMPS, EDGE, etc.).

The data warehouse optimizer 104 of the illustrated example receives data analysis instructions 102, and extracts relevant data from one or more data warehouses 106, 108, 110 in response to the analysis instructions 102. Rather than inundate each of the data warehouses 106, 108, 110 with both a data query (acquisition) and statistical processing, the data warehouse optimizer 104 of the illustrated example extracts (e.g., copies) specific data, which is responsive to a given set of instructions 102 from one or more of the data warehouses 106, 108, 110 and stores the extracted data to a temporary memory 116. As such, the data warehouse optimizer 104 relieves the data warehouses 106, 108, 110 from the responsibility of performing complex statistical data processing, thereby allowing each of the data warehouses 106, 108, 110 to focus on the tasks of data storage, archival, and data provisioning in response to requests. The memory 116 may be implemented using a mass storage optical, magnetic, and/or solid-state memory and may be used to store the executable API mentioned above and/or data collected from the data warehouse(s) 106, 108, 110 that is to be used for building block statistics, as discussed in further detail below.

Although only one optimizer 104 is shown in FIG. 1, persons of ordinary skill in the art will appreciate that multiple optimizers 104 may be employed. The data warehouse optimizer(s) 104 of the illustrated example are implemented on a computer, such as a personal computer (PC). Persons of ordinary skill in the art will appreciate that costs of computers and/or computer hardware have decreased, thereby making PCs a cost judicious alternative for dedicated processing tasks. Additionally or alternatively, the data warehouse optimizer(s) 104 may be implemented on a server, including one or more hard disk drives to store collected data received from the data warehouses 106, 108, 110. The PCs and/or servers implementing the optimizer(s) 104 may be located at or near the data warehousing business facility to process client requests. Alternatively, the PCs and/or servers implementing the optimizer(s) 104 may be owned by one or more clients. Thus, for example, a data warehouse optimizer 104 may execute as an API on the client machine to create and/or process the data analysis instructions 102. Such APIs may be sold or licensed to the clients, and/or the data warehousing business may charge the client a per-transaction fee to use the API.

Figure 2:
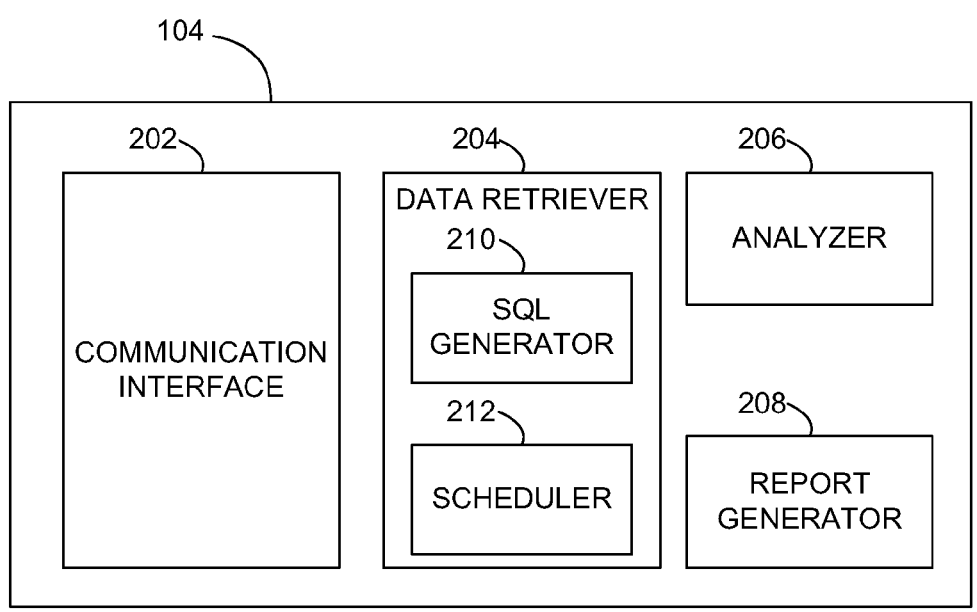
FIG. 2 is a block diagram of the example data warehouse optimizer of FIG. 1.

An example data warehouse optimizer 104 is shown in further detail in FIG. 2. In the illustrated example, the data warehouse optimizer 104 includes a communication interface 202, a data retriever 204, an analyzer 206, and a report generator 208. Additionally, the example data retriever 204 includes a structured query language (SQL) generator 210 and a scheduler 212. As discussed above, the communication interface 202 enables communication via a dedicated connection, a direct connection, and/or a network 114, such as an intranet or the Internet. Communication to/from the example data warehouse optimizer 104 may occur via web-pages (e.g., Active Server Pages), command-line user interfaces, graphical user interfaces, and/or kiosks. The communication interface 202 may include one or more protective measures (e.g., a firewall) to shield the data warehouse optimizer 104 from unauthorized use and/or tampering.

Data analysis instructions 102, such as an XML file, are received by the communication interface 202 and provided to the data retriever 204. The data analysis instructions 102 may contain one or more parameters, attributes, statistics, and/or formatting instructions for the requested report(s). For example, the data analysis instructions 102 may specify the type(s) of data of interest and/or that data should be extracted from a data warehouse for a particular time period (e.g., day, week, month, etc.), a particular broadcast program (e.g., sporting event, movie, sit-com, etc.), and/or for a particular demographic group (e.g., children, teenagers, adults, senior citizens, Mexican-Americans, Polish-Americans, etc.). The data analysis instructions 102 may also specify a particular data warehouse 106, 108, 110 from which the data is to be retrieved.

Many data warehouses may contain private, privileged (e.g., attorney/client communications, social security numbers, bank account numbers, etc.), and/or business sensitive data. Thus, the data analysis instructions 102 may also contain one or more authentication parameters to control connection and/or access to an entire data warehouse, or specific facets of the data warehouse. Accordingly, the data retriever 204 of the illustrated example may invoke the communication interface 202 to establish a connection for data transfer. Authentication between the data warehouse optimizer 104 and a data warehouse 106, 108, 110 may include, but is not limited to, secure sockets layer (SSL), digital certificates, password protection, encryption, and/or public key cryptography.

Once the example data warehouse optimizer 104 connects to a particular data warehouse 106, 108, 110, the SQL generator 210 may create query commands specific to the requested data identified in the data analysis instructions 102. In some examples, the instructions 102 may recite "Situation-Comedy" as a data parameter for which the data warehouse optimizer 104 is to analyze viewership numbers. Similarly, the instructions 102 may recite "Retirees" as another data parameter for which the data warehouse optimizer 104 is to analyze viewership numbers. However, exact parameter nomenclature between the data analysis instructions 102 and one or more of the data warehouses 106, 108, 110 may not exist. As such, the data retriever 204 may resolve any disparity between one or more of the data warehouses 106, 108, 110 and the analysis instructions 102 using, for example, metadata. Thus, for instance, while the example data analysis instructions 102 may recite "SituationComedy," the data warehouse may, instead, employ the term "sitcom." The metadata maps the nomenclature between one or more terms so that a lack of exact parity between the data warehouses 106, 108, 110 and the analysis instructions 102 does not prevent data processing from occurring. The data retriever of the illustrated example accomplishes metadata resolution by associating frequently used alternative nomenclature with the nomenclature employed by a particular analysis instruction 102 (e.g., an XML file). Alternatively, the data analysis instructions may include any number of alias nomenclature terms to associate with data warehouse nomenclature such that, if a first attempt to match an analysis parameter with a data warehouse parameter fails, then an alternate nomenclature term from the analysis instructions may be attempted.

In other examples, the data retriever 204 resolves data analysis instructions in coded values employed by one or more data warehouses. Coded values may be used rather than explicit values to, for example, save memory. For example, the data warehouse may employ an integer number scale from 1 to 4 for a representation of four different income levels. A value of "1" may represent an income threshold between $10,000 and $20,000; a value of "2" may represent an income threshold between $20,000 and $40,000; a value of "3" may represent an income threshold between $40,000 and $70,000; and a value of "4" may represent income thresholds exceeding $70,000. As such, the data retriever 204 may resolve (i.e., translate) any data received from the warehouse in, for example, an income column to the appropriate income threshold after, for example, retrieving entries corresponding to a particular value of 1 to 4. Thus, for example, if the data analysis instructions request only threshold incomes between $20,000 and $40,000, then, in this example, the data retriever 204 will generate SQL query instructions using the associated value "2," which is understood by the target data warehouse as a valid query input term.

In the illustrated example, the scheduler 212 can be structured to periodically and/or aperiodically copy some or all of the data that is related to the data analysis instructions 102 and/or building block statistics from one or more data warehouses to the memory 116. Thus, while the preceding examples illustrate the data retriever 204 acquiring data from the data warehouses in response to receiving data analysis instructions 102, the relevant data warehouse information (e.g., one or more parameters, attributes, statistics, and/or formatting instructions) may already be stored in the memory 116 as a result of a retrieval occurring in the prior periodic, aperiodic, and/or manual data acquisition invoked by the scheduler 212. Thus, it may not be necessary to query the data warehouse(s) in response to a given instruction set 102.

As discussed above, data warehouses may experience periods of heavy use, such as during the Super Bowl or Olympic Games, when a large portion of a country may be watching a significant event(s). The scheduler 212 may retrieve relevant data from the data warehouse during periods when such heavy use is not likely to occur (e.g., to replicate relevant portions of the database), thereby ensuring faster query response times due to less burdened data warehouse processor(s). Similarly, data warehouse activity may be lower during the early morning hours. Thus the scheduler 212 may be configured to acquire (e.g., replicate) one or more portion(s) of the data warehouses every day, for example, at 2:00 AM.

After data extraction from one or more data warehouses 106, 108, 110 and storage to memory 116 is complete, the data warehouse optimizer 104 may invoke the analyzer 206 to process the data in view of the data analysis instructions 102. Rather than invoke data analysis via SQL commands/instructions to be performed by one or more processors of the data warehouse(s) 106, 108, 110, data analysis may be performed by the data warehouse optimizer 104. The optimizer 104 may be programmed in any desired computer language. Persons of ordinary skill in the art will appreciate that Java programs are platform independent and may execute much faster than other programs implemented with SQL scripts. Therefore, Java is particularly well suited for implementing some or all of the optimizer 104.

The data warehouse optimizer 104 of the illustrated example is particularly well suited for business intelligence (BI) reporting applications. The optimizer 104 of the illustrated example is able to perform statistical calculations directly in the database(s) 112 of the data warehouse(s) 106, 108, 110 and/or on the data in the memory 116. SQL-based approaches become increasingly inefficient and cumbersome when the reporting requirements of the data analysis instructions 102 become more complex and the data sets of the database(s) 112 are large. Unlike simple SQL extract commands realized by use of the data warehouse optimizer 104, SQL-based calculations typically require multi-pass SQL and temporary tables that perform relatively slowly. Additionally, because the data extracted from the data warehouses 106, 108, 110 is focused on a client's particular objectives as determined by the data analysis instructions 102, subsequent data processing of that data by the data warehouse optimizer 104 executes faster because there is less non-relevant data to sort through.

The analyzer 206 of the illustrated example begins data analysis by processing building-block statistics (also referred to herein as primary statistics). Generally speaking, the primary/building-block statistics may include one or more calculations based on data directly available from the data warehouse(s) 106, 108, 110. On the other hand, composite statistics (also referred to herein as secondary statistics) may be calculated based on, in part, results obtained from the primary statistics and/or additional data from the data warehouse(s) 106, 108, 110. The building-block statistics may be generated by a multi-phase process. For instance, one or more preliminary phases of grouping and organization may make subsequent composite statistical calculations possible. For example, building block statistics may include, but are not limited to, a sum of viewers watching a particular broadcast program, a histogram of broadcast programming viewership nationwide, an average viewership of broadcast programming by state, etc. As discussed above, while the examples illustrated herein are particular to broadcast programming and/or viewership, the systems, methods, and apparatus described herein may apply, without limitation, to any type of data warehousing subject matter. The building block statistics may also include categorization of discrete buckets of information and one or more subgroups contained therein. For example, a bucket of type "demographic" may be calculated from the collected data. For any particular data sample size, such as a single day, multiple days, weeks, and/or months, the demographic bucket may contain different demographic subgroups. For instance, a data sample during a weekend may include a demographic bucket having a relatively large percentage of adult males watching television programs during afternoon hours. As another example, a data sample during weekdays may include a demographic bucket having a relatively large percentage of women of ages 40-60 watching television programs during afternoon hours.

Metadata also allows the data warehouse optimizer 104 to determine which data to obtain from a data warehouse 106, 108, 110. In some examples, the metadata contains relationships between facts and dimensions of a star schema. Such relationships permit the SQL generator 210 of the example data retriever 204 to generate appropriate SQL-based extraction commands. In another example, the data warehouse optimizer 104, via the analyzer 206, examines the composite statistics generated by the data analysis instructions 102. Furthermore, the metadata may determine, based on requested composite statistics, which building block statistics are needed to calculate the composite statistics.

Composite statistics, on the other hand, may employ some or all of the building block statistics. Such composite statistics may be calculated by the analyzer 206 of the illustrated example during one or more processing phases subsequent to the building block phase(s). For example, a composite statistic may include determining a percentage of women of ages 40-60 watching television during the weekday that are in an income threshold of $70,000 or more. In this example, the composite statistic is based on the block statistics of: (1) women aged 40-60 and (2) women with an income of $70 k or more. In other examples, a composite statistic may include determining the relative percentage viewership for football versus Olympic Games watched by the adult males during a given weekend. Such a composite statistic may be based on one or more building block statistics The report generator 208 of the illustrated example utilizes report formatting parameters specified in the data analysis instructions 102 and/or default parameters to provide the client with processed data results. Reports may be provided in one or more formats, including, but not limited to, tab delimited files, spreadsheets, graphs, histograms, pie-charts, and/or trend-analysis curves. The report generator 208 of the illustrated example may additionally or alternatively invoke a web-server of the communication interface 202 to generate such report information in a web-browser viewable format.

Figure 3:
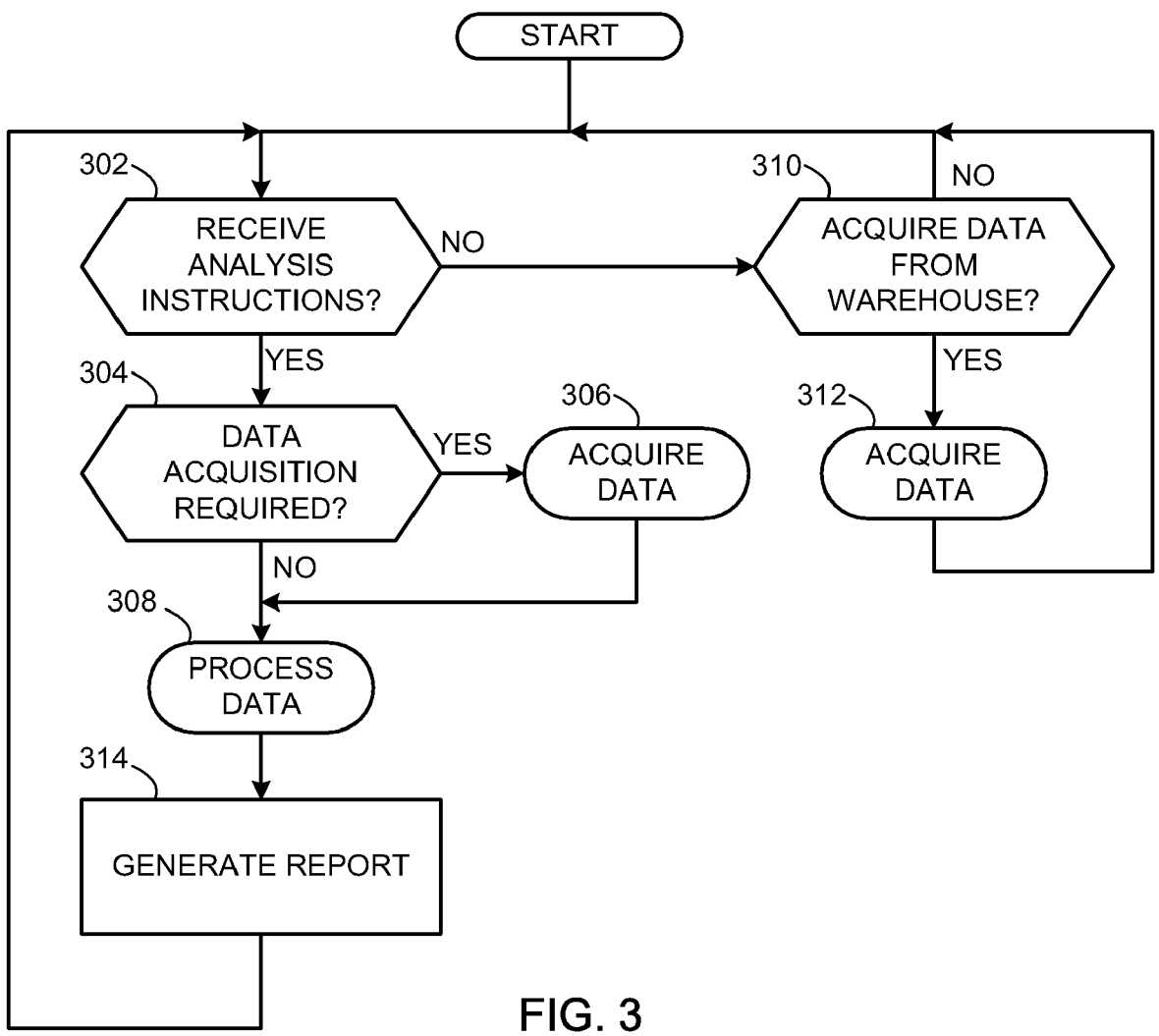
FIG. 3 is a flow chart representative of example machine readable instructions that may be executed to implement the example data warehouse optimizer of FIGS. 1 and 2.
Figure 4:
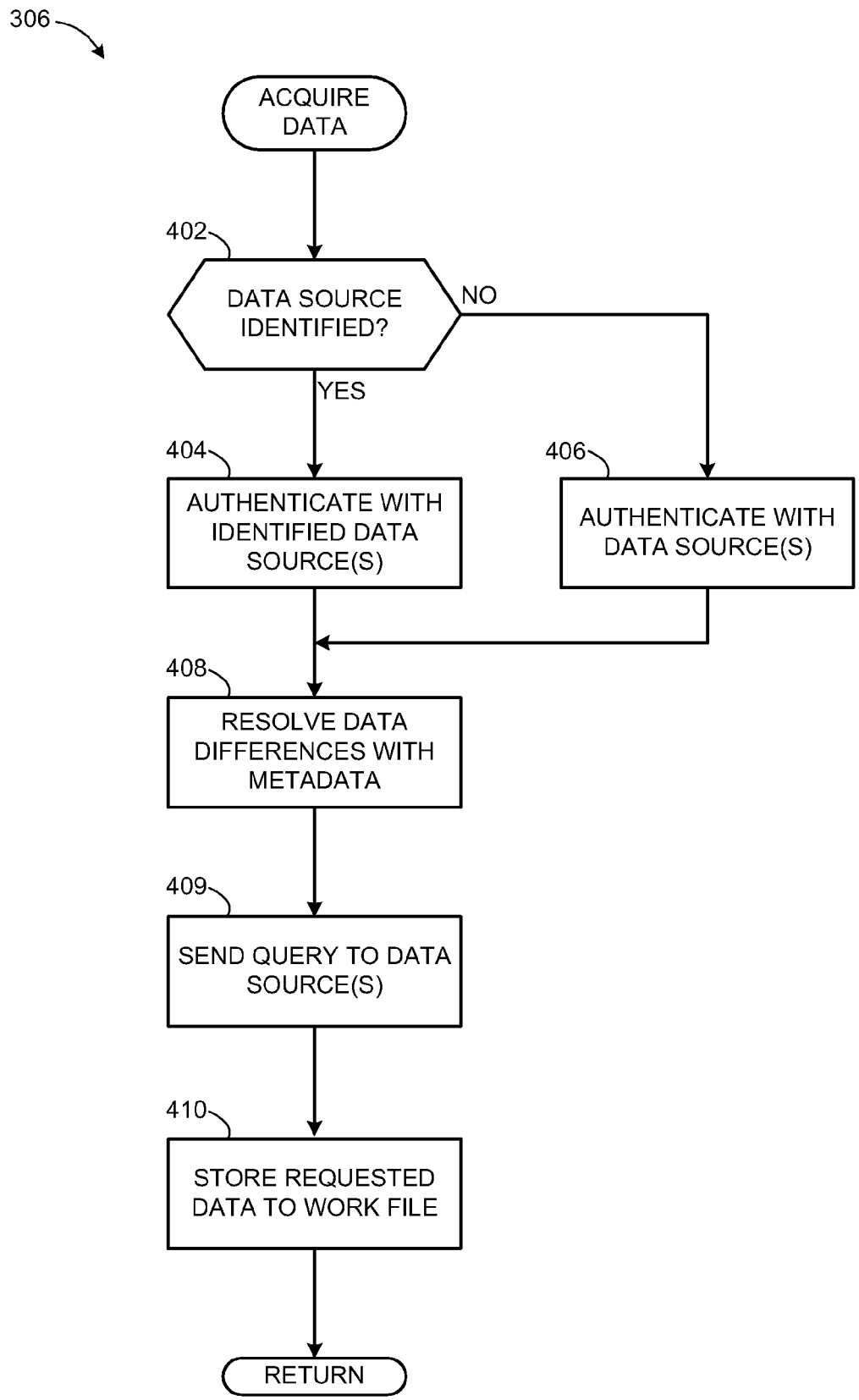
FIG. 4 is a flow chart representative of example machine readable instructions that may be executed to acquire data for the example instructions of FIG. 3.
Figure 5:
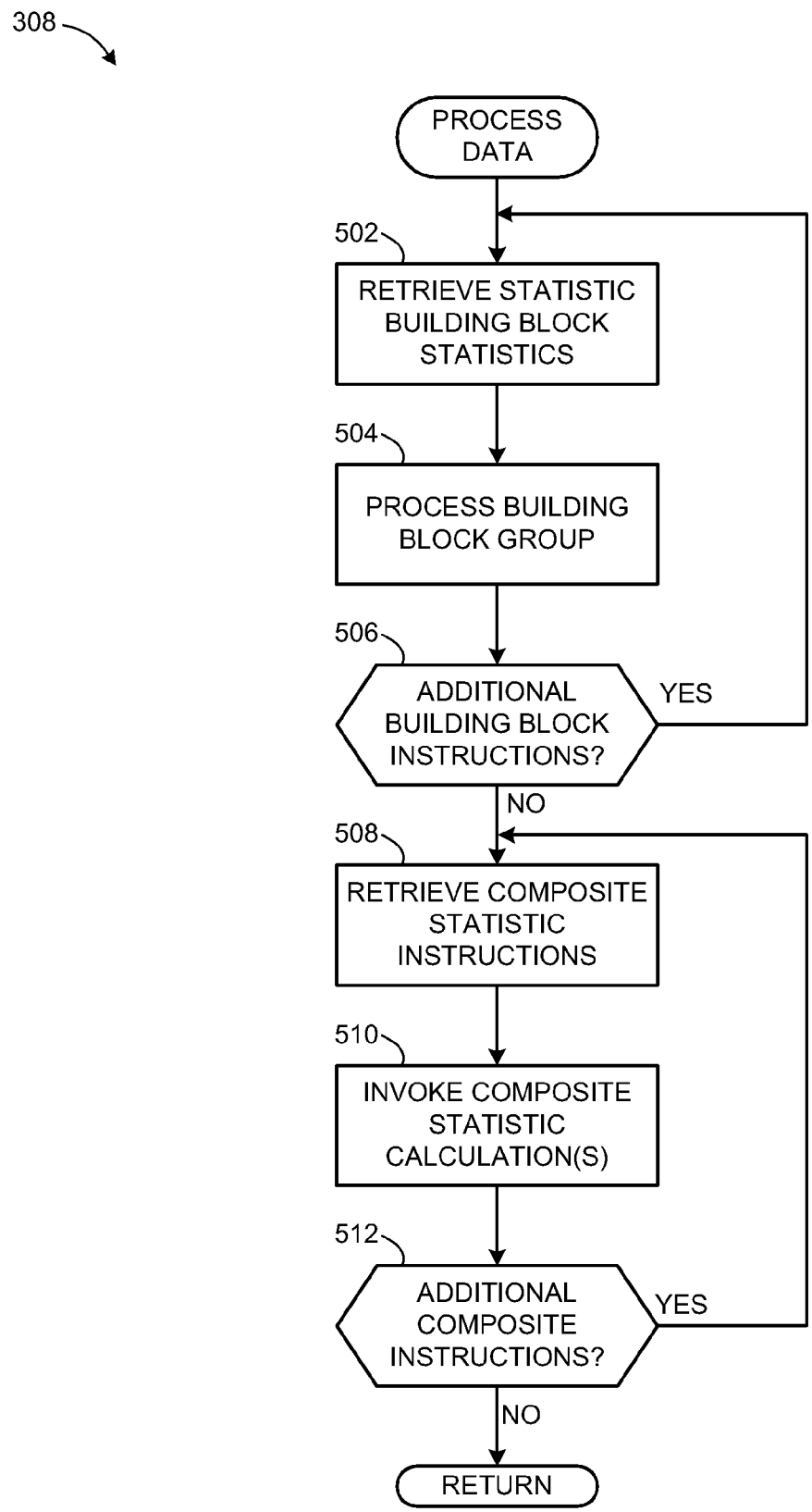
FIG. 5 is a flow cart representative of example machine readable instructions that may be executed to process data in the example instructions of FIG. 3.

Flowcharts representative of example machine readable instructions that may be executed to implement the example data warehouse optimizer 104 of FIGS. 1 and/or 2 are shown in FIGS. 3 through 5. In these examples, the machine readable instructions represented by each flowchart may comprise one or more programs for execution by: (a) a processor, such as the processor 1012 of FIG. 10, (b) a controller, and/or (c) any other suitable device. The one or more programs may be embodied in software stored on a tangible medium such as, for example, the memory 116 (see FIG. 1), but persons of ordinary skill in the art will readily appreciate that the entire program or programs and/or portions thereof could alternatively be executed by a device other than the processors 1012 and/or embodied in firmware or dedicated hardware (e.g., implemented using an application specific integrated circuit (ASIC), a programmable logic device (PLD), a field programmable logic device (FPLD), discrete logic, etc.). For example, the processor 1012, the I/O controller 1022, the memory controller 1020, and/or the network interface 1030 could be implemented using any combination of software, hardware, and/or firmware. Also, some or all of the blocks represented by the flowcharts of FIGS. 3 through 5 may be implemented manually. Further, although the example machine readable instructions are described with reference to the flowcharts illustrated in FIGS. 3 through 5, persons of ordinary skill in the art will readily appreciate that many other techniques for implementing the example methods and apparatus described herein may alternatively be used. For example, with reference to the flowcharts illustrated in FIGS. 3 through 5, the order of execution of the blocks may be changed, and/or some of the blocks described may be changed, eliminated, combined and/or subdivided into multiple blocks.

Referring to FIG. 3, the communication interface 202 of the data warehouse optimizer 104 may receive analysis instructions 102 in the form of, for example, a text file, binary file, XML file, or other instruction format (block 302). If the analysis instructions 102 require data from one or more data warehouse(s) (block 304), then the SQL generator 210 and data retriever 204 of the data warehouse optimizer 104 acquire relevant data from the warehouse(s) (block 306) as discussed below in view of FIG. 4. If the analysis instructions 102 require only locally stored data (e.g., data previously retrieved from the warehouse(s) by the scheduler 212) (block 304), then the analyzer 206 of the data warehouse optimizer 104 processes the data stored in the local memory 116 (block 308).

If no analysis instructions 102 are received by the data warehouse optimizer 104 (block 302), then the scheduler 212 of the data warehouse optimizer 104 determines if a scheduled acquisition time has been reached (block 310). As discussed above, in examples where the data warehouse(s) are implemented (in whole or in part) the scheduler 212 may be configured to query and acquire a copy of any new data found in the relevant portion(s) of the warehouse(s) each day at 2:00 AM (block 306). If an acquisition time has not occurred (block 310), control returns to block 302. If the acquisition time has occurred (block 310), a request for the corresponding relevant data is invoked (block 312).

Returning to block 308, after data has been processed pursuant to the analysis instructions 102 (block 308, as discussed further in view of FIG. 5), the report generator 208 generates a report for the client(s) (block 314). Control then returns to block 302.

FIG. 4 is a flowchart illustrating an example manner of implementing blocks 306 and 312 of FIG. 3. If the instructions being provided specify a particular data warehouse or warehouses (block 402), then the communication interface 202 establishes a connection with those data warehouse(s) 106, 108, 110 via an authentication protocol (block 404). On the other hand, if the analysis instructions 102 do not identify one or more specific data warehouse(s) (block 402), then the process 306 may proceed using data in the local memory 116 and/or the data retriever 204 may connect, authenticate, and/or acquire data from one or more data warehouse(s) that are known to contain data relevant to the instructions (block 406). As discussed above, because the data warehouse(s) 106, 108, 110 may employ parameter nomenclature that is different than the nomenclature employed by the analysis instructions 102, the data retriever 204 may resolve such differences via metadata (block 408). A query created by the SQL generator 210 is then sent to the remote and/or local data source(s) (e.g., the local memory 116 and/or one or more warehouses 106, 108, 110 (block 409). Data returned by the data source(s) is then stored in a data work file in the memory 116 (block 410), which may contain one or more parameter data, one or more attributes, one or more statistics, one or more building block statistics, and/or one or more formatting instructions.

FIG. 5 is a flowchart illustrating an example manner of implementing block 308 of FIG. 3. As discussed above, the data analysis instructions 102 may include one or more statistic formulae to be calculated using the data extracted from the data warehouse(s) 106, 108, 110. Alternatively, the analyzer 206 may include default formulae. The analyzer 206 retrieves the work file stored at block 410 of FIG. 4 and generates any building block statistics to be processed from the analysis instructions 102 (block 502). Such building block statistics may be stored in the memory 116 for later use. The analyzer 206 then processes the building block statistics in view of the received target parameters (block 504). Building block statistics may be used as a basis for one or more other statistical calculations that involve greater complexity, additional combinations, and/or alternate permutations of target parameters of the acquired data stored in the memory 116. As such, the building block statistics may be calculated in one or more batches/groupings. Upon completion of any one particular building block statistic that is identified in the analysis instructions 102, the analyzer 206 determines if the analysis instructions 102 include additional building block statistical instructions (block 506). If more building block statistics are to be calculated, control returns to block 502. Otherwise, the analyzer 206 retrieves composite statistic instructions from the analysis instructions 102 and/or from default instructions associated with the analyzer 206 (block 508) (e.g., from an XML file).

As discussed above, the composite statistics may be calculated, in part, by using earlier calculated building block statistics. The analyzer 206 processes such composite statistics in view of the target parameters and/or previously calculated building block statistic results (block 510). Much like the building block statistics, the composite statistics may be calculated in one or more batches and/or groupings. Upon completion of any one particular composite statistical instruction, the analyzer determines if the analysis instructions include additional composite statistical instructions (block 512). If more composite statistical instructions are to be calculated, process control returns to block 508.

Employing the data warehouse optimizer 104 of the illustrated example allows a highly scalable alternative to traditional BI reporting methods that perform complex statistical calculations, sorting, and/or grouping in a SQL-based manner. Data warehouses 106, 108, 110 are typically expensive monolithic servers that require significant expense to upgrade. In light of the above disclosed approach to data retrieval, grouping, and statistical calculations, less expensive PCs may be employed in a scalable manner to generate client reports much faster than prior techniques. Persons of ordinary skill in the art will appreciate that other programming languages may be used to implement all or part of the data warehouse optimizer 104. Such programming languages may include, but are not limited to, ASNI C, C++, and/or C#.

Figure 6:
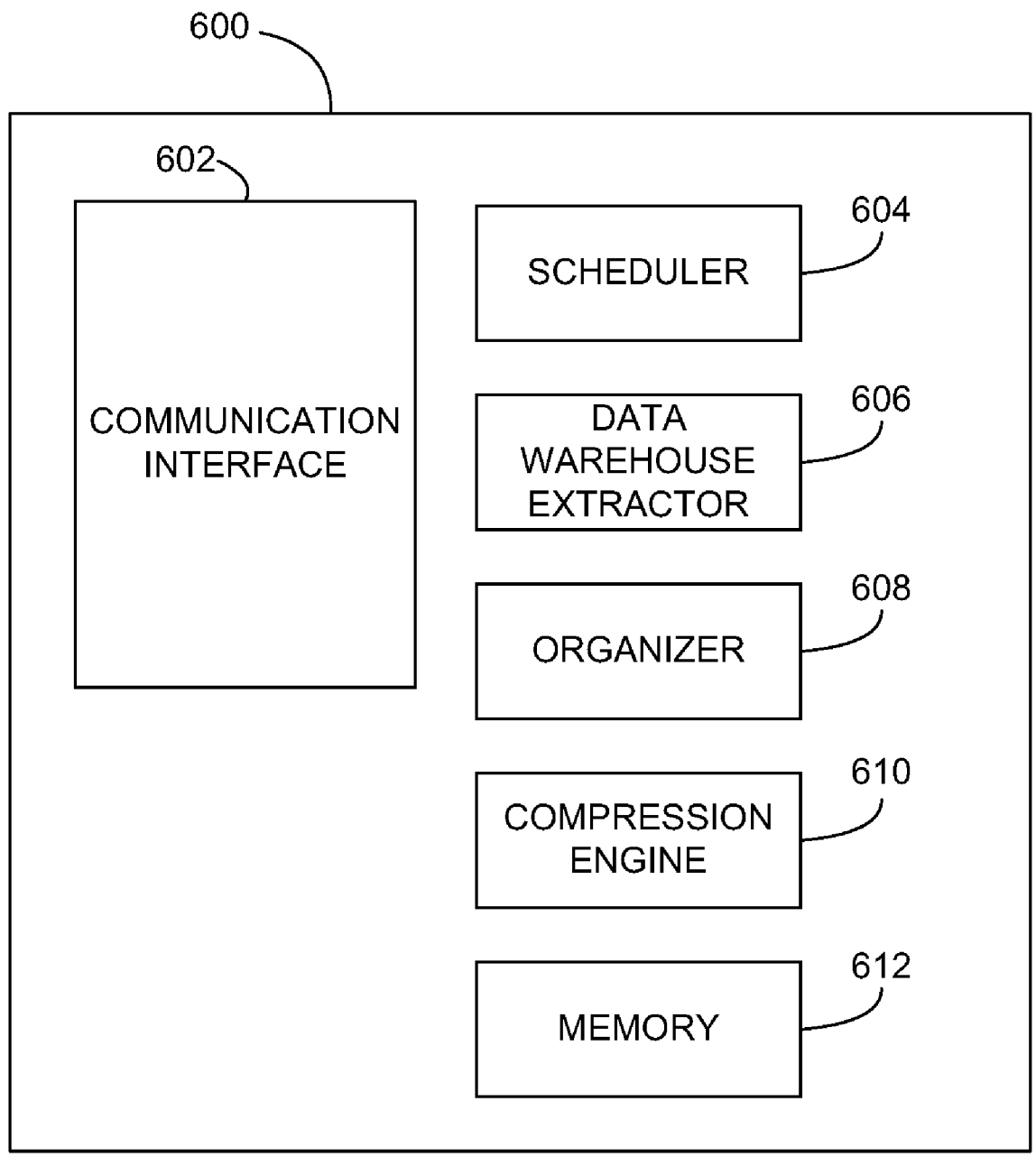
FIG. 6 is a block diagram of an example data formatter to improve data warehouse performance.

In order to more efficiently store and access data obtained from one or more warehouses, the example system may further be provided with a data formatter 600, as shown in FIG. 6. An example data formatter 600 may be implemented as a part of the data retriever 204 of FIG. 2 and/or operate as a separate module of the data warehouse optimizer 104. Without limitation, the example data formatter 600 may be completely separate from the data warehouse optimizer 104 and/or execute data formatting techniques on data warehouse 106, 108, 110 information before storing it to the memory 116.

The example data formatter 600 of FIG. 6 includes a communication interface 602 (or may share the communication interface 202 of FIG. 2), a scheduler 604 (which may be the scheduler 212 of FIG. 2), a data warehouse extractor 606, an organizer 608, a compression engine 610, and a memory 612. The memory 612 may be external to the example data formatter 600, may access the example memory 116 shown in FIG. 1, and/or may be implemented by the memory 116.

The communication interface 602 operates in a manner similar to that of the communication interface 202 of FIG. 2. For example, the communication interface 602 enables communication between the data formatter 600 and one or more data warehouses, such as the warehouses 106, 108, 110 shown in FIG. 1. Communication may occur via network connections that employ Ethernet® communication protocols, IEEE-802.11 (Wi-Fi®), Bluetooth®, 900 MHz, 1.6 GHz, and/or mobile communications protocols (e.g., CDMA, TDMA, GSM, AMPS, EDGE, etc.). Additionally or alternatively, communication to/from the example data formatter 600 may occur via direct connections that employ the universal serial bus (USB) communication protocol, and/or the FireWire® communication protocol (i.e., IEEE-1394). Data received from the data warehouses 106, 108, 110 by the communication interface 602 may be sent to/from any one of the scheduler 604, data warehouse extractor 606, the organizer 608, the compression engine 610, and/or the memory 612.

Data stored in a data warehouse may take one or more forms, including offline operational databases, offline data warehouses, real time data warehouses, and/or integrated data warehouses. Data sources of the data warehouses may refer to any electronic repository of information, and may include mainframe databases (e.g., IBMS DB2, VSAM, ISAM, Adabas, etc.), client-server databases (e.g., Oracle®, Informix®, SQL Server®, etc.), and/or PC databases (e.g., Microsoft® Access®). Data warehouses typically store data that is grouped together by subject areas, which may reflect the general usage of the data (e.g., customers, products, finances, etc.). Such grouping may include use of a dimensional approach, in which information is stored as facts, which may be numeric or textual data specific to transactions and/or events. Additionally or alternatively, dimensions (e.g., structural schema elements of a database/warehouse) may contain reference information that allows transactions to be classified in different ways. For example, a sales transaction may be broken up into facts including a number of product(s) ordered and the price(s) paid. Additionally, dimensions may include other factors, such as sale date, customer information, product details, geographic location of the sale, and which salesperson made the sale.

Figure 7:
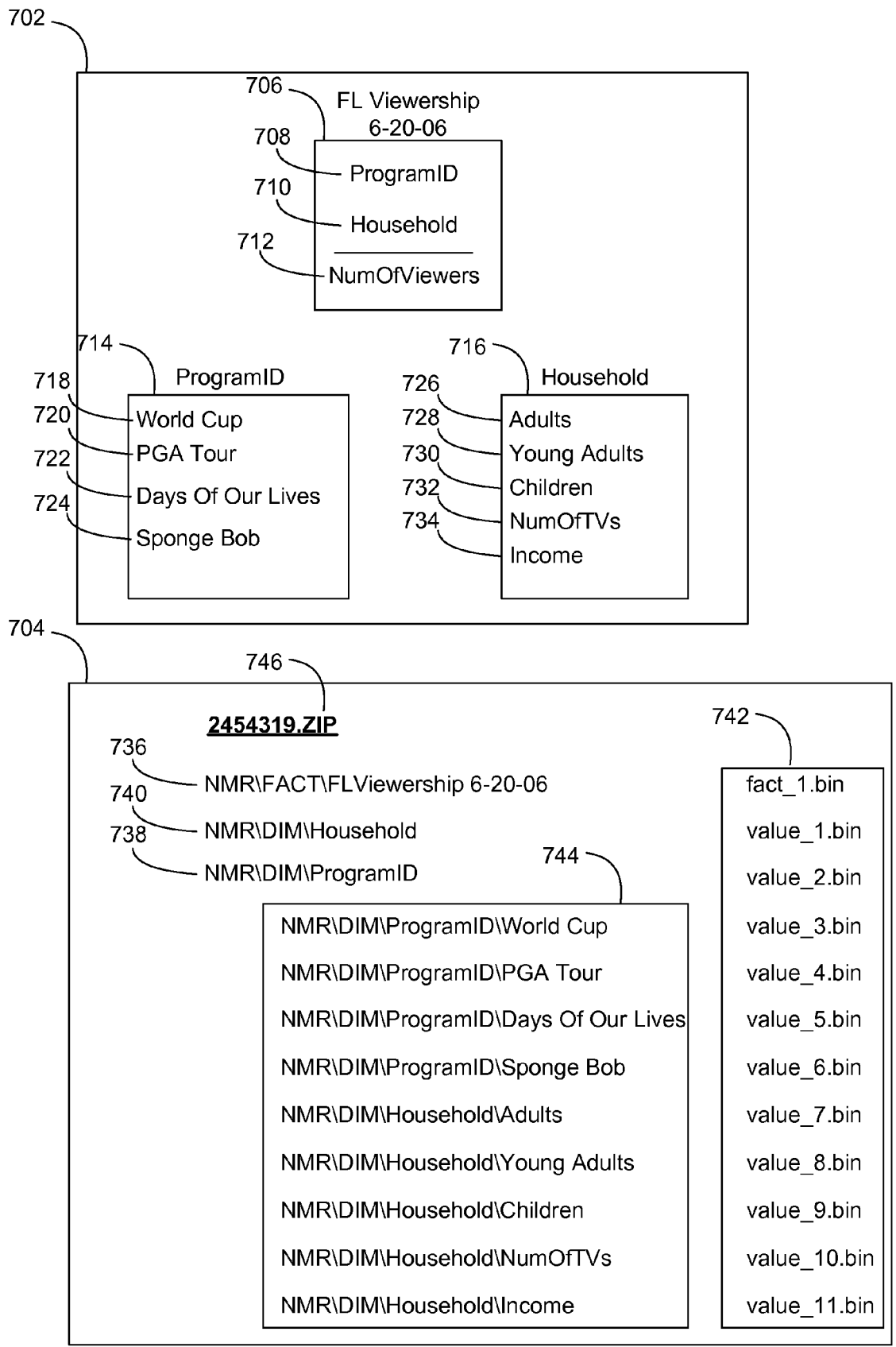
FIG. 7 is an example data warehouse schema and a corresponding hierarchical directory path for use in the example system of FIG. 1.

While the data warehouse optimizer 104 and the data formatter 600 may operate with any database schema, a star schema is discussed below for illustrative purposes. The star schema includes a single fact table having a compound primary key (e.g., FL Viewership 6-20-06, as shown in FIG. 7). The fact table contains quantitative or factual data about a subject of interest, for example, a business and/or other organization. Each of the different keys (e.g., ProgramID and/or Household of FIG. 7) of a fact table includes a corresponding dimension table, which may include additional columns of facts and/or different attributes of the example business.

The communication interface 602 may be invoked by the scheduler 604 on a periodic, aperiodic, and/or predetermined basis to connect to one or more data warehouses. Many data warehouses contain sensitive and/or private data. Thus, such warehouses may require authentication before access and/or extraction of the data contained therein. Authentication between the data formatter 600 and a data warehouse 106, 108, 110 may include, but is not limited to, secure sockets layer (SSL), digital certificates, password protection, encryption, and/or public key cryptography.

Once the data formatter 600 connects to one or more particular data warehouse(s) 106, 108, 110, the data warehouse extractor 606 constructs one or more query commands, such as SQL-based extraction commands, to obtain data from the data warehouse(s). The extraction commands from the data warehouse extractor 606 typically operate in a substantially non-discriminatory manner and acquire all data from a time period of interest (e.g., a particular day, from multiple days, from a particular week, and/or from any other timeframe). Without limitation, the data warehouse extractor 606 may construct extraction commands in a more discriminating manner, which may require SQL-based extraction commands of greater complexity. For example, the data warehouse extractor 606 may review and/or parse all or part of the data analysis instructions 102 to obtain specific parameters that should be extracted from the data warehouse(s) 106, 108, 110. Data extracted from the data warehouses may be saved in the memory 612 for later organization, and/or organization may occur in real time during the data extraction process.

The organizer 608 creates a hierarchical directory file path structure based on the structure (domain specific details) of the data warehouse(s) 106, 108, 110 from which the data was obtained. For example, in a star schema configuration for the data warehouses 106, 108, 110, every dimension is modeled as a directory. As described above, the dimension(s) may be one or more structural schema elements of a database and/or warehouse, and each dimension may have one or more columns of data. A dimension for products, for example, may include columns relating to product identification, product cost, product size, etc. Each dimension directory may contain a number of separate directories for each column of the dimension. Generally speaking, the organizer 608 may create a first hierarchical directly file path associated with the highest (e.g., most broad, most general) abstraction of the data warehouse(s) 106, 108, 110. Further, the organizer 608 may create a second hierarchical directory file path associated with one or more abstraction(s) of the data warehouse(s) 106, 108, 110 that are more narrow than that of the first hierarchical directory file path. Any number of additional hierarchical directory file path(s) may be created by the example organizer 608 to accommodate one or more data warehouse Under each column of a given dimension is a first binary file containing mappings of dimension keys to identifier (ID) data (e.g., "id.bin"). Each key (e.g., such as the one or more keys of a fact table that result in a dimension table) is a primary key of the dimension, and the ID is a numeric that represents a value of that column. Each column also includes a second binary file containing mappings of ID data to values (e.g., "valuemap.bin"). Using both of these files allows derivation (e.g., via a query based on the data analysis instructions 102) of an actual value of a column for a certain key by sequentially mapping through the file mapping hierarchy in a sequential manner. For example, if a fact table included a key named "Household" and the household dimension table included a key named "Income," then associated values for a query may be determined by following a logical hierarchical directory path of "DIM/Household/Income" to retrieve corresponding values (e.g., value__11.bin in FIG. 7). Navigation of one or more hierarchical directory paths described herein further reduces and/or eliminates a need for SQL commands when accessing data. As a result, data access may be simplified via directory navigation using, for example, a web browser, kiosk, and/or a directory tree.

Upon completion of the hierarchical directory structures by the organizer 608, the compression engine 610 may compress all of the binary files to save storage space. Compression techniques may include, but are not limited to, shrinking methods, reducing methods, imploding methods, and/or tokenizing methods. A ZIP file format may be employed to take advantage of its open format and prolific availability. The compression engine 610 may also compress the whole hierarchical directory into a single ZIP file with a date key filename, such as a Julian date code, illustrated in FIG. 7 below.

FIG. 7 illustrates an example star schema 702 and an example hierarchical directory path 704 created by the data formatter 600. The example star schema 702 includes a fact table "Florida Viewership Jun. 20, 2006" 706 having keys (e.g., primary keys, each of which is associated with a dimension) labeled "ProgramID" 708, and "Household" 710. The fact table includes "NumOfViewers" 712 as data. Additionally, the example star schema 702 includes corresponding dimension tables for each of the fact table 706 keys 708, 710. In particular, the example star schema 702 includes a "ProgramID" dimension table 714 and a "Household" dimension table 716. The "ProgramID" dimension table 714 includes additional dimension keys of "World Cup" 718, "PGA Tour"

720, "Days Of Our Lives" 722, and "Sponge Bob" 724. Similarly, the "Household" dimension table 716 includes dimension keys of "Adults" 726, "Young Adults" 728, "Children" 730, "NumOfTvs" 732, and "Income" 734.

The example data formatter 600 creates the hierarchical directory path 704 in a manner that reflects the structure of the data warehouse, which in the illustrated example of FIG. 7 is a star structure. In particular, the organizer 608 of the data formatter 600 creates a fact table path 736, a "ProgramID" dimension table path 738, and a "Household" dimension table path 740. As discussed above, each of the corresponding directories includes an associated binary file (column 742) containing mapping and/or data information. The example hierarchical directory path 704 also includes individual directory tag paths 744 for the "ProgramID" and "Household" dimension tables 714, 716. For example, upon navigating to one of the highest dimension table paths (e.g., 738 or 740) of the directory path 704, the corresponding binary file (of column 742) may contain mapping information to illustrate additional paths to which navigation may be performed. Thus, navigation to "NMR\DIM\ProgramID," which is associated with the binary file (e.g., a dimension mapping file) "value_1.bin," provides mapping information to allow navigation to one or more of the binary files of the directory tag paths 744. To that end, directory navigation may include any number of nested directory paths, each one sequentially accessed to provide additional mapping information (e.g., one or more navigation options), and/or data (e.g., viewership information). In the illustrated example of FIG. 7, a first hierarchical directory file path includes the fact table path 736, a second hierarchical directory file path includes either the dimension table path "NMR\DIM\ProgramID" 738 or "NMR\DIM\Household" 740, and a third hierarchical directory file path may include any one of the directory tag paths 744. When the organizer 608 completes the hierarchical directory path 704, the compression engine may save the directory as a ZIP file 746.

Figure 8:
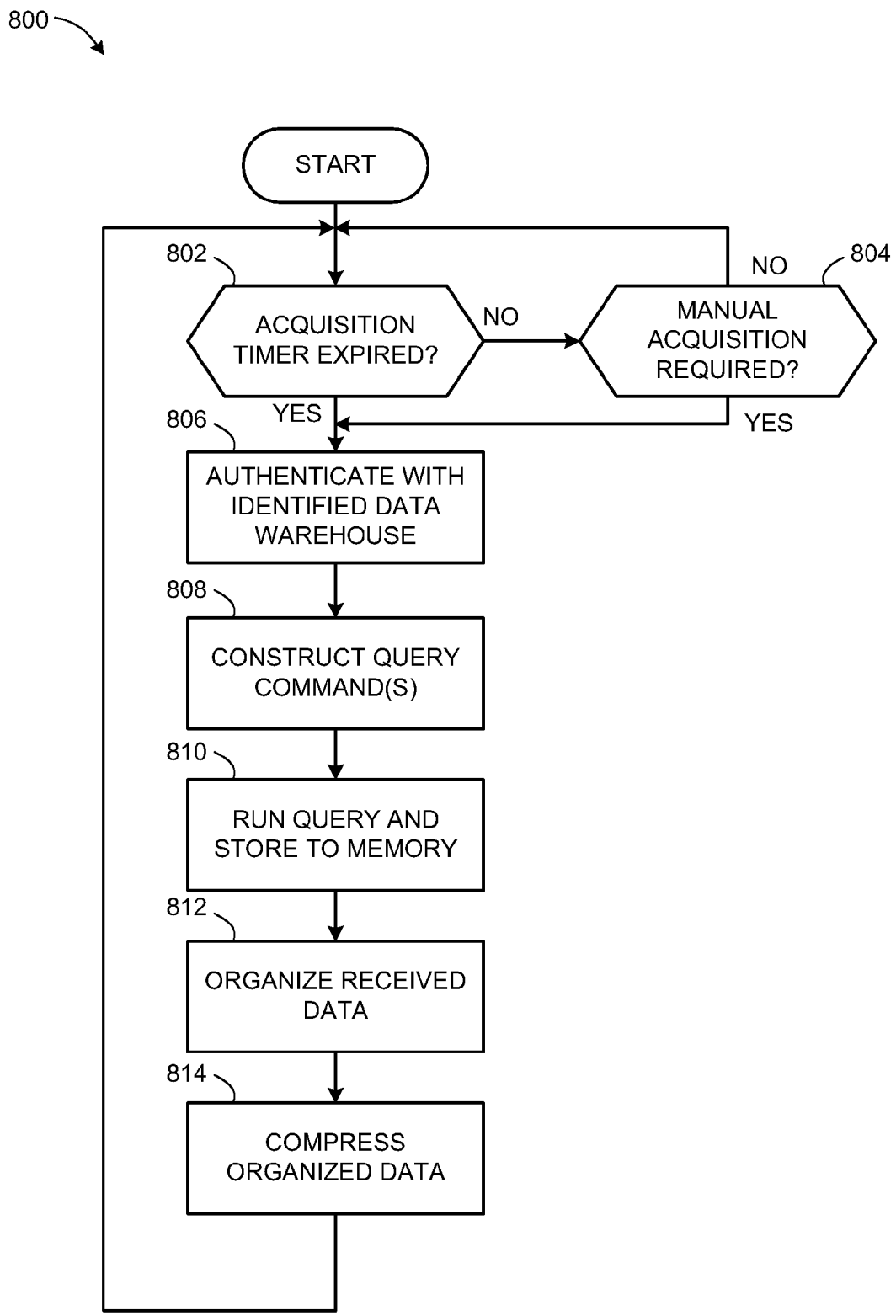
FIG. 8 is a flow chart representative of example machine readable instructions that may be executed to organize the example hierarchical directory path of FIG. 7.

FIG. 8 is a flowchart illustrating an example process to retrieve and format data from a data warehouse 800. As discussed above, the scheduler 604 may be configured to acquire data from the data warehouse(s) 106, 108, 110 in a periodic and/or aperiodic manner (block 802). Additionally or alternatively, the data acquisition may be invoked manually (block 804) by, for example, a client, user, and/or manager of a data acquisition and report generating business. Prior to obtaining data from one or more data warehouses 106, 108, 110, the communication interface 602 connects to a target data warehouse 106, 108, 110 and authenticates the connection (block 806) as a security measure to maintain data integrity (block 806).

The data warehouse extractor 606 of the illustrated example constructs query commands (block 808) for the target data warehouse 106, 108, 110, such as SQL-based commands to retrieve data. For example, the data warehouse extractor 606 may construct simple SQL-based data extraction commands having minimal qualification constraints, such as requesting all data for a particular hour, range of hours, day, range of days, week, etc. The query commands are then executed (block 810) and data returned from the data warehouse(s) is stored to the memory 612 (block 810).

The organizer 608 arranges the received data (block 812) into one or more hierarchical directory path(s) 704, which reflect domain specific details of the originating data warehouse(s) 106, 108, 110. As discussed above, while the illustrated examples employ a star schema format, the systems and methods described herein are not limited thereto, and may accommodate any database schema. Upon completion of the hierarchical directory path organization (block 812), the compression engine may compress the directory into, for example, a ZIP file (block 814). Control then returns to block 802.

Figure 9:
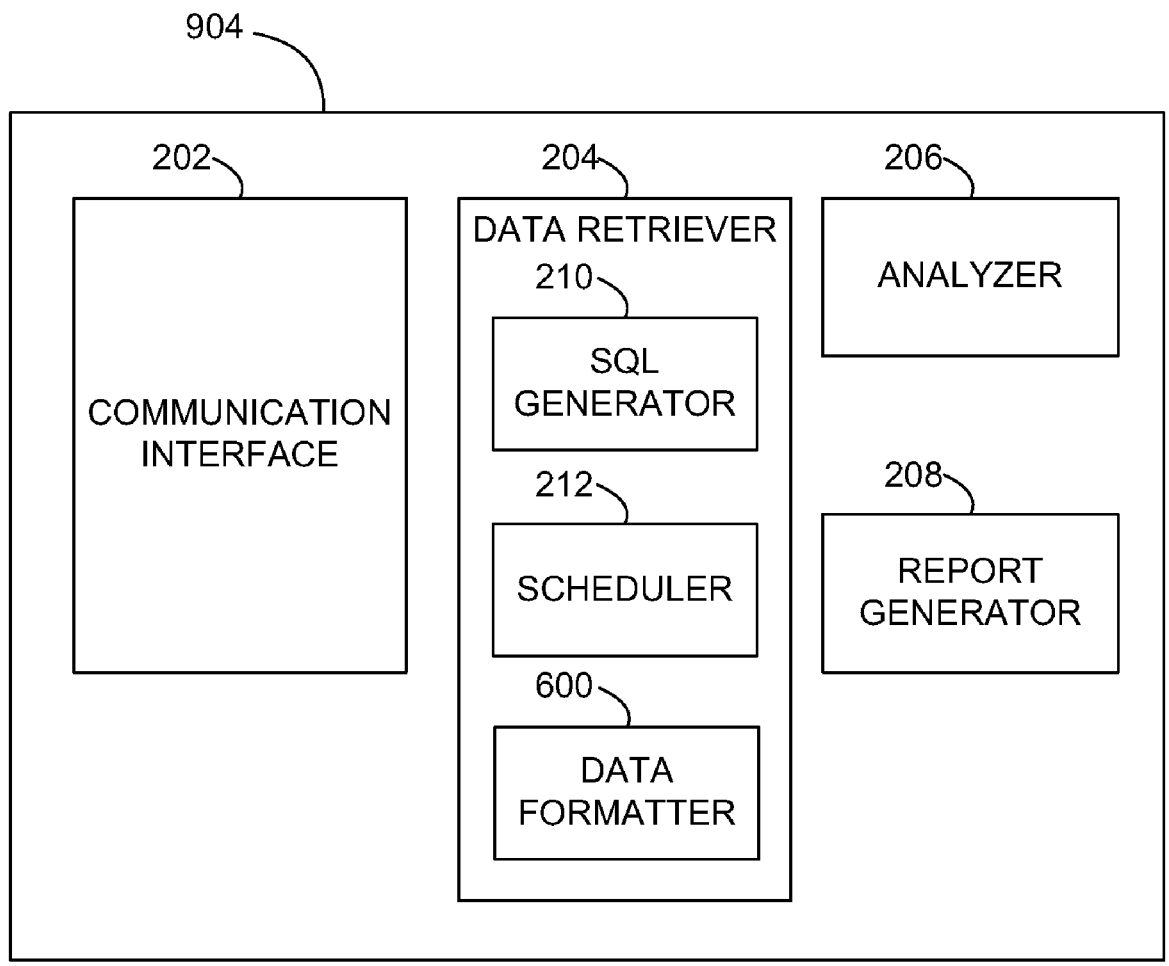
FIG. 9 is a block diagram of another example data warehouse optimizer.

FIG. 9 illustrates another example data warehouse optimizer 904. As discussed above, while the example data warehouse optimizer 104 of FIGS. 1 and 2 improve report generating times up to ten times as compared to SQL database engines by, in part, relieving data warehouses from any tasks associated with statistical calculation, and/or by performing such report generating processes in Java instead of SQL-based commands, additional report generating time improvements may be realized by also incorporating the data formatter 600. Rather than invoking SQL-based query commands for data warehouse data, the example data warehouse optimizer 904 of FIG. 9 may use the example hierarchical directory path(s) 704 to improve report generating time consumption by a factor of approximately one hundred.

The example data warehouse optimizer 904 of FIG. 9 is substantially the same as the example data warehouse optimizer 204 of FIG. 2, except for the addition of the data formatter 600 within the data retriever 204. Similar components are identified in FIG. 9 with similar labels from FIGS. 2 and 6, and will not be discussed further.

Figure 10:
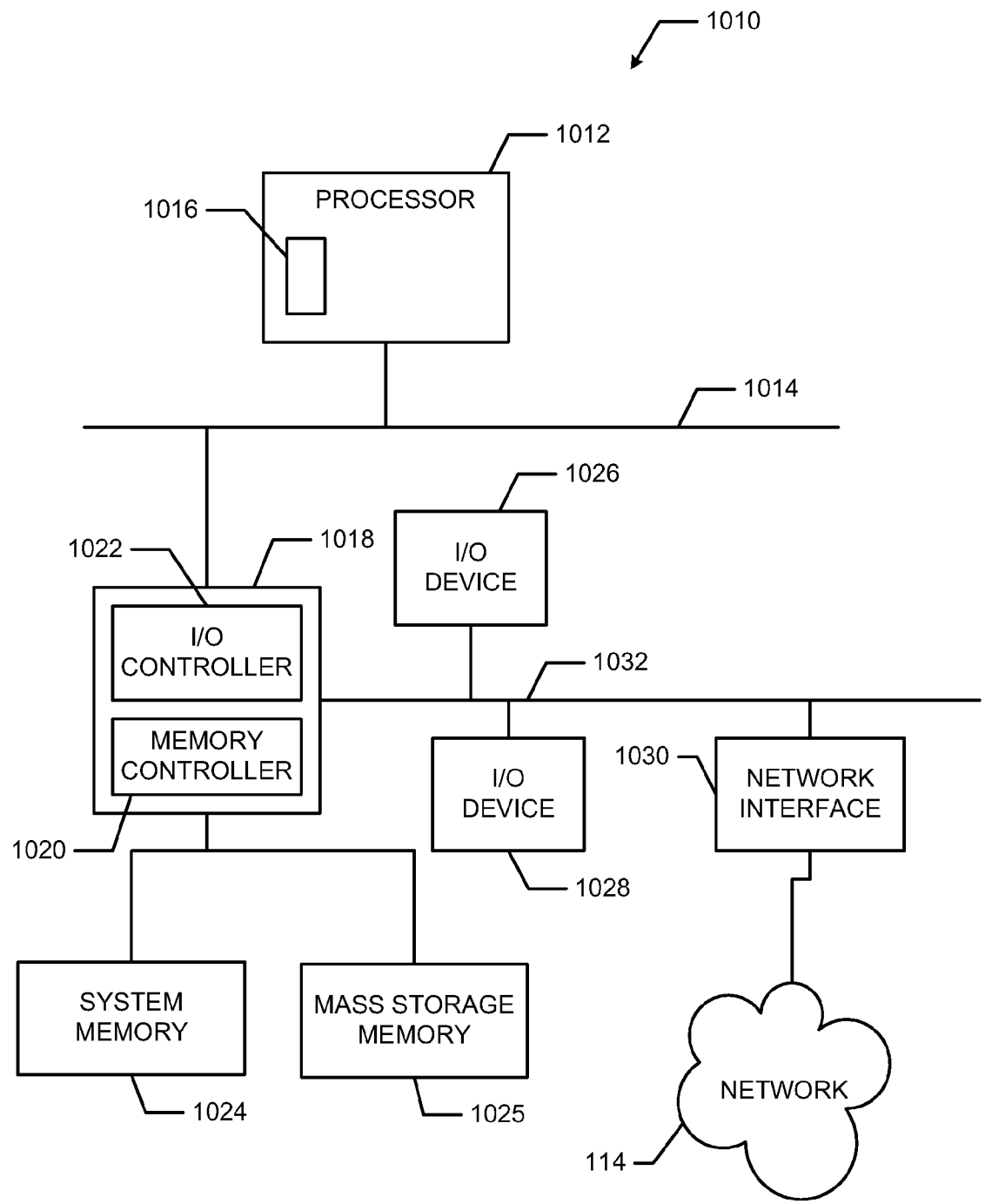
FIG. 10 is a block diagram of an example processor system that may be used to execute the example machine readable instructions of FIGS. 3-5, and/or 8 to implement the example systems and/or methods described herein.

FIG. 10 is a block diagram of an example processor system 1010 that may be used to execute the example machine readable instructions of FIGS. 3-5, and 8 to implement the example systems and/or methods described herein. As shown in FIG. 10, the processor system 1010 includes a processor 1012 that is coupled to an interconnection bus 1014. The processor 1012 includes a register set or register space 1016, which is depicted in FIG. 10 as being entirely on-chip, but which could alternatively be located entirely or partially off-chip and directly coupled to the processor 1012 via dedicated electrical connections and/or via the interconnection bus 1014. The processor 1012 may be any suitable processor, processing unit or microprocessor. Although not shown in FIG. 10, the system 1010 may be a multi-processor system and, thus, may include one or more additional processors that are identical or similar to the processor 1012 and that are communicatively coupled to the interconnection bus 1014.

The processor 1012 of FIG. 10 is coupled to a chipset 1018, which includes a memory controller 1020 and an input/output (I/O) controller 1022. As is well known, a chipset typically provides I/O and memory management functions as well as a plurality of general purpose and/or special purpose registers, timers, etc. that are accessible or used by one or more processors coupled to the chipset 1018. The memory controller 1020 performs functions that enable the processor 1012 (or processors if there are multiple processors) to access a system memory 1024 and a mass storage memory 1025.

The system memory 1024 may include any desired type of volatile and/or non-volatile memory such as, for example, static random access memory (SRAM), dynamic random access memory (DRAM), flash memory, read-only memory (ROM), etc. The mass storage memory 1025 may include any desired type of mass storage device including hard disk drives, optical drives, tape storage devices, etc.

The I/O controller 1022 performs functions that enable the processor 1012 to communicate with peripheral input/output (I/O) devices 1026 and 1028 and a network interface 1030 via an I/O bus 1032. The I/O devices 1026 and 1028 may be any desired type of I/O device such as, for example, a keyboard, a video display or monitor, a mouse, etc. The network interface 1030 may be, for example, an Ethernet device, an asynchronous transfer mode (ATM) device, an 802.11 device, a digital subscriber line (DSL) modem, a cable modem, a cellular modem, etc. that enables the processor system 1010 to communicate with another processor system.

While the memory controller 1020 and the I/O controller 1022 are depicted in FIG. 10 as separate functional blocks within the chipset 1018, the functions performed by these blocks may be integrated within a single semiconductor circuit or may be implemented using two or more separate integrated circuits.

Although certain methods, apparatus, systems, and articles of manufacture have been described herein, the scope of coverage of this patent is not limited thereto. To the contrary, this patent covers all methods, apparatus, systems, and articles of manufacture fairly falling within the scope of the appended claims either literally or under the doctrine of equivalents.

What is claimed is:

1. A computer implemented method to transform a first database into a second database, comprising:
    generating a first mapping file associated with a fact table of the first database, the first mapping file referenced by a first hierarchical directory file path;
    generating a second mapping file associated with a dimension table, the second mapping file referenced by a second hierarchical directory file path;
    appending the second hierarchical directory file path to the first hierarchical directory file path to facilitate access to the first and the second mapping files, respectively;
    copying data from the fact table of the first database to the first mapping file, and copying data from the dimension table of the first database to the second mapping file to form the second database; and
    retrieving data from the second database using the first and second mapping files via sequential navigation of the first and second hierarchical directory file paths in response to receiving a request to access data in the first database.

2. A method as defined in claim 1, wherein the sequential navigation comprises traversing a plurality of nested hierarchical directory file paths referenced by the first hierarchical directory file path.

3. A method as defined in claim 2, wherein executing the sequential navigation further comprises revealing a plurality of database dimensions, each one of the plurality of database dimensions defined by an associated dimension mapping file.

4. A method as defined in claim 1, wherein the dimension table comprises a dimension key, the dimension key associated with a data file stored in a third hierarchical file path, the third hierarchical file path nested under the second hierarchical file path.

5. A method as defined in claim 1, further comprising identifying at least one nested hierarchical file path in response to receiving at least one of the first or second mapping files, the at least one nested hierarchical file path comprising a subsequent level of the first or second hierarchical file path.

6. A method as defined in claim 1, wherein generating the hierarchical path further comprises generating a star schema structure.

7. A tangible article of manufacture storing machine readable instructions stored thereon which, when executed, cause a machine to, at least:
    generate a first mapping file associated with a fact table of the first database, the first mapping file referenced by a first hierarchical directory file path;
    generate a second mapping file associated with a dimension table, the second mapping file referenced by a second hierarchical directory file path;
    append the second hierarchical directory file path to the first hierarchical directory file path to facilitate access to the first and the second mapping files, respectively;
    copy data from the fact table of the first database to the first mapping file, and copying data from the dimension table of the first database to the second mapping file to form the second database; and
    retrieve data from the second database using the first and second mapping files via sequential navigation of the first and second hierarchical directory file paths in response to receiving a request to access data in the first database.

8. An article of manufacture as defined in claim 7, wherein the machine readable instructions further cause the machine to execute a sequential navigation by traversing a plurality of nested hierarchical directory file paths referenced by the first hierarchical directory file path.

9. An article of manufacture as defined in claim 7, wherein the machine readable instructions further cause the machine to associate a dimension key with a data file stored in a third hierarchical file path, the third hierarchical file path nested under the second hierarchical file path.

10. An article of manufacture as defined in claim 7, wherein the machine readable instructions further cause the machine to identify at least one nested hierarchical file path in response to receiving at least one of the first or second mapping files, the at least one nested hierarchical file path comprising a subsequent level of the first or second hierarchical file path.

* * * * *